US009594969B1

United States Patent
Negi et al.

(10) Patent No.: US 9,594,969 B1
(45) Date of Patent: Mar. 14, 2017

(54) IRIS RECOGNITION INCLUDING LIVENESS TESTING

(71) Applicant: Intel Corporation, Santa Clara, CA (US)

(72) Inventors: Ansuya Negi, Beaverton, OR (US); Nitin V. Sarangdhar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/945,652

(22) Filed: Nov. 19, 2015

(51) Int. Cl.
*G01J 5/00* (2006.01)
*G06K 9/00* (2006.01)
*H04N 5/225* (2006.01)
*H04N 5/33* (2006.01)
*G06K 9/52* (2006.01)
*G06T 7/60* (2006.01)
*G06K 9/46* (2006.01)

(52) U.S. Cl.
CPC ..... *G06K 9/00906* (2013.01); *G06K 9/00604* (2013.01); *G06K 9/00617* (2013.01); *G06K 9/4661* (2013.01); *G06K 9/52* (2013.01); *G06T 7/60* (2013.01); *H04N 5/2256* (2013.01); *H04N 5/33* (2013.01)

(58) Field of Classification Search
CPC .......................... G06F 21/32; G06F 17/30256
See application file for complete search history.

(56) References Cited

U.S. PATENT DOCUMENTS

| | | | | |
|---|---|---|---|---|
| 5,291,560 | A * | 3/1994 | Daugman | A61B 3/1216 351/206 |
| 9,008,375 | B2 * | 4/2015 | Malhas | G06K 9/00906 382/117 |
| 2014/0226876 | A1 * | 8/2014 | Savvides | G06K 9/00604 382/117 |
| 2016/0026862 | A1 | 1/2016 | Anderson | |
| 2016/0049094 | A1 * | 2/2016 | Gupta | G09B 19/04 434/185 |

(Continued)

OTHER PUBLICATIONS

Nixon et al., "Spoof Detection Schemes," 2007, Published in Handbook of Biometrics, Springer, Editors A.K. Jain, P. Flynn, and A.A. Ross, 16 pages.*

(Continued)

*Primary Examiner* — Kiho Kim
(74) *Attorney, Agent, or Firm* — Grossman, Tucker, Perreault & Pfleger, PLLC (57) ABSTRACT

This disclosure pertains to iris recognition including liveness testing. A device may perform iris recognition with testing to check liveness. Sensing circuitry in the device may comprise an IR sensor and IR emitter to generate a uniform IR emission and a pulsed IR emission. Sensor data based on the uniform IR emission may be used for iris recognition, which may be confirmed by at least one test confirming that real eyes are being analyzed and not spoof data. For example, a determination may be made as to whether a light reflection is visible in images captured by the IR sensor, whether the light reflection is aligned and/or synchronized with an eye center and/or iris center, whether a portion of the iris visible in the captured images changes from image to image, whether the images show that a pupil of the eye is reactive to the pulsed IR emissions, etc.

24 Claims, 6 Drawing Sheets

(56) References Cited

U.S. PATENT DOCUMENTS

2016/0125221 A1* 5/2016 Kim .................... G06K 9/0061
                                                                                             382/117

OTHER PUBLICATIONS

Kim et al., "Developement of a Smartphone-based pupillometer," 2013, Journal of the Optical Society of Korea, vol. 17, No. 3, pp. 249-254.*

Yambay et al., "LivDet-Iris 2013—Iris Liveness Detection Competition 2013", 2013, 8 pages.*

Costa et al., "Dynamic features for iris recognition," 2012, IEEE Transactions on Systems, Man, and Cybernetics—Part B: Cybernetics, vol. 42, No. 4, pp. 1072-1082.*

International IOR Rectifier, IRLML0030TRPbF, HEXFET Power MOSFET, www.irf.com, Feb. 29, 2012, 10 pages.

Storm, Darlene; "Black Hat: Hacking iris recognition systems"; Computerworld, Jul. 17, 2012, 5 pages.

IR OSLUX (810nm), Version 1.10, SFH 4780S, OSRAM, Opto Semiconductors, Jun. 12, 2015, 13 pages.

* cited by examiner

IRIS RECOGNITION INCLUDING LIVENESS TESTING

TECHNICAL FIELD

The present disclosure relates to security systems, and more particularly, to a system able to determine when false data is being used in an attempt to overcome iris recognition protection.

BACKGROUND

Technological achievements in the area of electronic communications have resulted in a widespread adoption of electronic interaction to execute many transactions. For example, users are more frequently relying on equipment such as desktop computers, laptop computers, tablet computers, smart phones, etc. to complete various tasks electronically. Examples of these tasks may include, but are not limited to, personal interaction (e.g., texting, email, social media, etc.), professional interaction (e.g., email, videoconferencing, etc.), scheduling, financial transactions, commercial transactions, location determination, navigation, etc. The tasks may be facilitated by applications that execute on the equipment. In the performance of these tasks an application may request or require that a user input sensitive or confidential data including, for example, personal identification data, contact data, medical data, residential or business addresses, contact or client lists, account numbers, professional registration numbers, intellectual property, information that may be considered a trade secret, etc. This data may be useful to a variety of unauthorized users, and thus, protecting device/system integrity of has become an important focus for development.

While new security systems are continually being developed to defend user equipment, hackers are also continually turning out malicious code (e.g., malware) to overcome them. This has led developers to move from purely code-derived protections to systems that are not as easy to replicate. For example, biometric-based security systems may be able to sense characteristics of a user's body and use these characteristics as keys to control access permission. Examples of biometric identification used in security systems may include, but are not limited to, fingerprint scanning, facial recognition, iris recognition, retina recognition, vein mapping, finger geometry, hand geometry, voice recognition, gait recognition and various other types of recognition related to body traits. While biometric identification offers some protection in that it may correspond to user traits that are not easily duplicated, research has already been presented demonstrating how some bodily traits can already be impersonated or "spoofed" using recorded or synthesized data.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

This disclosure pertains to iris recognition including liveness testing. In general, a device may be capable of performing iris recognition with testing to check liveness. Sensing circuitry including at least an IR emitter and IR sensor may be used to perform iris recognition. In performing iris recognition the IR emitter may generate a uniform IR emission and a pulsed IR emission. Sensor data generated based on the uniform IR emission may be used to perform iris recognition. The iris recognition may be confirmed by at least one test to confirm that real eyes are being analyzed and not spoof data. For example, a determination may be made as to whether a light reflection generated by the uniform or pulsed IR emission is visible in images captured by the IR sensor, whether the light reflection is aligned with an eye and/or iris center, whether the eye and/or iris center is synchronized with the light reflection, etc. In a second test, a determination may be made as to whether the portion of the iris visible that is in the captured images changes from image to image. A third test may determine whether the captured images show that a pupil of the eye is reactive to the pulsed IR emissions. Testing may be confirmed by, for example, instructing the subject of iris recognition (e.g., to move, blink, etc.), data generated by a secondary sensor in the system that may corroborate the findings of the iris recognition, etc.

In at least one embodiment, an example system including iris recognition functionality may comprise at least sensing circuitry and processing circuitry. The sensing circuitry may be to generate sensor data based on sensing characteristics of at least one eye when illuminated by IR emissions. The processing circuitry may be to cause the sensing circuitry to generate uniform infrared emissions and pulsed infrared emissions, perform iris recognition using the sensor data and perform at least one liveness test using the sensor data.

In at least one embodiment, example sensing circuitry may comprise at least an infrared emitter, an infrared receiver, a resistor and a switch. The processing circuitry may be to perform iris recognition using the sensor data generated based on the uniform infrared emissions. The processing circuitry may also be to perform the at least one liveness test using the sensor data generated based on the pulsed infrared emissions. The sensor data may comprise at least one image of the at least one eye illuminated by the uniform or pulsed infrared emissions and in performing the at least one liveness test the processing circuitry may be to determine if a light reflection generated by the uniform or pulsed infrared emissions appears in the at least one image. The processing circuitry may also be to determine if the light reflection appearing in the at least one image is centered with at least one of an eye center or iris center appearing in the at least one image and/or to determine if the light reflection appearing in the at least one image is synchronized with at least one of an eye center or iris center appearing in the at least one image.

In at least one embodiment, the sensor data may comprise images including an iris of the at least one eye illuminated by the uniform or pulsed infrared emissions and in performing the at least one liveness test the processing circuitry may be to determine if a size of a visible area of the iris varies in the images. The sensor data may also comprise images including a pupil of the at least one eye illuminated by the pulsed infrared emissions and in performing the at least one liveness test the processing circuitry may be to determine if a size of the pupil varies in the images corresponding to the pulsed infrared emissions. In the same or another embodiment the system may further comprise user interface circuitry and the processing circuitry is further to cause user interface circuitry to generate notifications. The sensing circuitry may further comprise at least one secondary sensor to generate secondary data for confirming the iris recognition. Consistent with the present disclosure, an example method for iris recognition with liveness testing may comprise causing sensing circuitry in a system to generate uniform infrared emissions and pulsed infrared emissions, generating sensor data in the sensing circuitry based on at least one eye being illuminated by at least one of the uniform or pulsed IR emissions, performing iris recognition in the system using the sensor data and performing at least one liveness test in the system using the sensor data.

Figure 1:
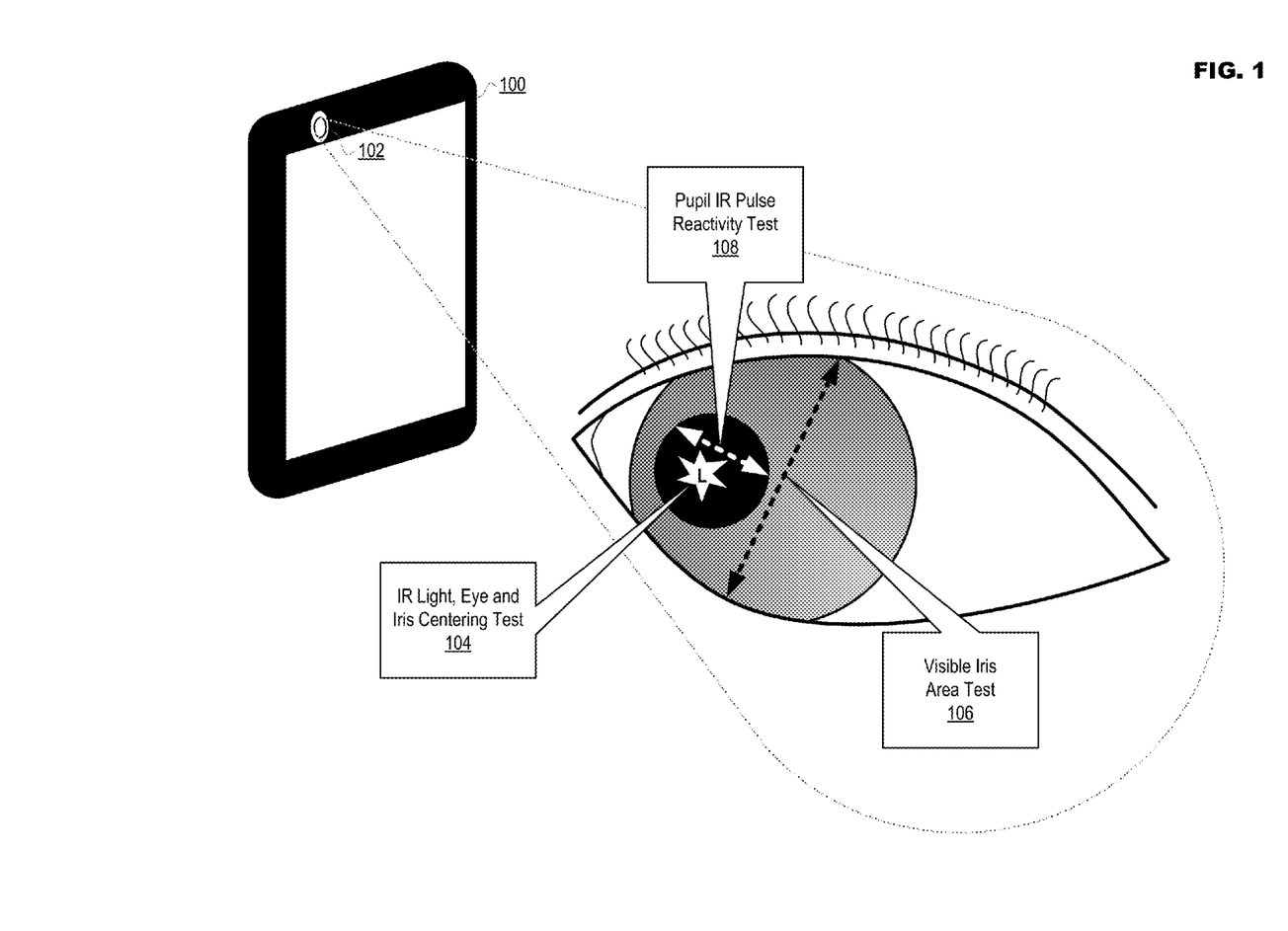
FIG. 1 illustrates an example system performing iris recognition including liveness testing in accordance with at least one embodiment of the present disclosure.

FIG. 1 illustrates an example system performing iris recognition including liveness testing in accordance with at least one embodiment of the present disclosure. Implementations are discussed herein utilizing technologies such as infrared (IR) emission control and IR sensing, applications such as iris recognition, etc. These particular technologies and/or applications are offered merely as readily comprehensible examples from which the teachings discussed herein may be understood. Other technologies, applications, etc. may be implemented consistent with the present disclosure. In addition, the inclusion of an apostrophe after an item number in a drawing figure (e.g., 100') indicates that an example embodiment of the particular item number is being shown. These example embodiments are not intended to limit the present disclosure to only what is illustrated, and have been presented herein merely for the sake of explanation. As referenced herein, iris recognition may be an automated method of biometric identification that uses mathematical pattern-recognition techniques on video images of one or both of the irises of an individual's eyes. The irises may comprise complex random patterns that are unique, stable, and can be seen from some distance. Images may be captured of the irises using IR emitters and sensors. Iris pattern data may be stored for known users. Those seeking access may be scanned and have their scan data compared to the stored data to determine whether access is permitted. Liveness, as referenced herein, are behavioral characteristics of living systems. For example, a liveness test of an eye determines if the eye is real or a spoof using contrived/prerecorded data.

An example system 100 is illustrated in FIG. 1. While system 100 is illustrated as a single device, it is also possible for system 100 to comprise more than one device. For example, a first device (e.g., a server) may process sensor data while one or more other devices may perform iris recognition. The devices in system 100 may be collocated and/or remotely located (e.g., portals in a secure facility may each comprise iris recognition equipment for access control). In general, system 100 may include at least one device utilizing iris recognition to control access. Examples of system 100 may include, but are not limited to, a mobile communication device such as a cellular handset or a smartphone based on the Android® OS from the Google Corporation, iOS® or Mac OS® from the Apple Corporation, Windows® OS from the Microsoft Corporation, Linux® OS, Tizen® OS and/or other similar operating systems that may be deemed derivatives of Linux® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, Apple Watch® from the Apple Corporation, etc., an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, a server, a group of computing devices organized in a high performance computing (HPC) architecture, a smart television or other type of "smart" device, small form factor computing solutions (e.g., for space-limited applications, TV set-top boxes, etc.) like the Next Unit of Computing (NUC) platform from the Intel Corporation, a system to control operations and/or access security for structures, large machinery, vehicles (e.g., cars), etc.

System 100 may comprise at least sensing circuitry 102. Sensing circuitry 102 may include at least image capture equipment to capture at least one image for use in iris recognition. Sensing circuitry 102 may generate an IR emission to illuminate one or both eyes of a user seeking access to, for example, system 100, hardware and/or software on system 100, resources to which access is controlled by system 100, etc. An IR sensor in sensing circuitry 102 may then capture at least one more image of one or both eyes illuminated by the IR emission. The patterns illuminated in the images of the iris or irises may be processed and used to recognize the user, grant access, etc. Iris identification relies on more than 240 points for user identification, as opposed to fingerprint scanning which may use only 20-40 points to identify a user. The increased level of scrutiny, the uniqueness of each iris, etc. has resulted in iris recognition being considered very reliable for use in biometric identification. However, now researchers have determined that it may be possible to fool or "spoof" iris recognition through the use creating synthetic Iris patterns. Until now face and fingerprint based biometric patterns were assumed to be easily obtained, but now even Iris patterns may be easily recreated, and it is not possible to replace Iris data once lost to spoofing.

Consistent with the present disclosure, at least one additional test may be performed by system 100 to help ensure that one or more actual eyes are being analyzed and not contrived or prerecorded data or images used to, for example, spoof device 100 into permitting access to an unauthorized user. In general, the tests may focus on characteristics of a human eye that would be difficult to recreate in contrived or prerecorded data. For example, these characteristics may pertain to how the eye or eyes react to certain stimuli delivered on a real-time basis. Examples of tests that may be performed are shown in FIG. 1 at 104, 106 and 108. While only three tests are shown, fewer or more tests may be performed on different characteristics of the user's eyes. Moreover, tests 104, 106 and 108 may be performed alone or in combination. IR, eye and iris centering test 104 may determine whether an IR light reflection (e.g., labeled as "L" in FIG. 1) is present in at least one image captured by sensing circuitry 102, whether the IR light reflection, eye and iris center are aligned om at least one image, and whether the IR light reflection, eye and iris are synchronized in subsequent frames. Initially, the IR light reflection may be generated by a uniform or pulsed IR emission from sensing circuitry 102. The IR emission will cause a bright spot in images captures by sensing circuitry 102. This bright spot may not appear in fabricated data. Moreover, when the eye of the user is presented for scanning, the centers of the eye and iris should naturally align with the center of the IR sensor, which should cause these centers to also fall in line with the IR light reflection. During scanning the user may move slightly from image to image, but the centers should remain substantially aligned during this movement as it will be natural for a live person to remain focused on the center of the IR sensor during capture. A missing IR light reflection in an image, a lack of centering in an image or through a series of images may fail liveness (e.g., indicate that a real eye is not present for iris recognition).

During iris recognition a user's eyelid may move naturally due to blinking or reactively (e.g., in response to uniform or pulsed IR emissions from sensing circuitry 102). The movement of the user's eyelid changes the amount of iris that would be visible to sensing circuitry 102, and thus, during iris recognition the amount of visible iris captured is expected to change from image to image. In at least one embodiment, visible iris area test 106 may evaluate a portion of at least one iris that is visible in a series of captured images to determine whether it is consistent with the behavior of an eye in real time. The visible portion of the iris not changing at all over the series of images, not changing in a manner consistent with the type of IR emission occurring at a given time, etc. may be indicative of contrived and/or previously recorded iris data (e.g., "spoof data"). Pupil IR pulse reactivity test 108 may evaluate the reactivity of at least one pupil of a user's eye in response to, for example, pulsed IR emissions. While not visible, upon initial exposure to IR emissions the human eye will react. For example, as a user approaches sensing circuitry 102 the IR emission may cause the pupil of the user to change diameter (e.g., to dilate). In this manner, one or more pupils dilating as a user approaches sensing circuitry 102 may be used to determine that the sensor data originates from a real eye. The rate at which a pupil dilates may be variable (e.g., based on the user), but in general may occur quickly within the first few captured images. Pulsing the IR emissions may help to slow down the reaction of the pupil to ensure that at least one instance of eye reaction to the IR emission is captured. This behavior will be described more in respect to FIGS. 4 and 5. In at least one embodiment, following the generation of a uniform IR emission that is used to capture frame for iris recognition, a period of IR pulses may be generated and the reaction of one or both of the user's eyes may be captured by sensing circuitry 102. The reactive behavior of one or both pupil's may be evaluated to determine if the expected reaction is occurring in synchronization with the pattern of pulses. The synchronization aspect may be used to enhance pupil IR pulse reactivity test 108 in that the pattern of pulses may be varied with the expectation that the one or more eyes will react in accordance with the pulse pattern. This may then remove the ability for spoof data to include reactivity to a constant or known pulse pattern.

Figure 2:
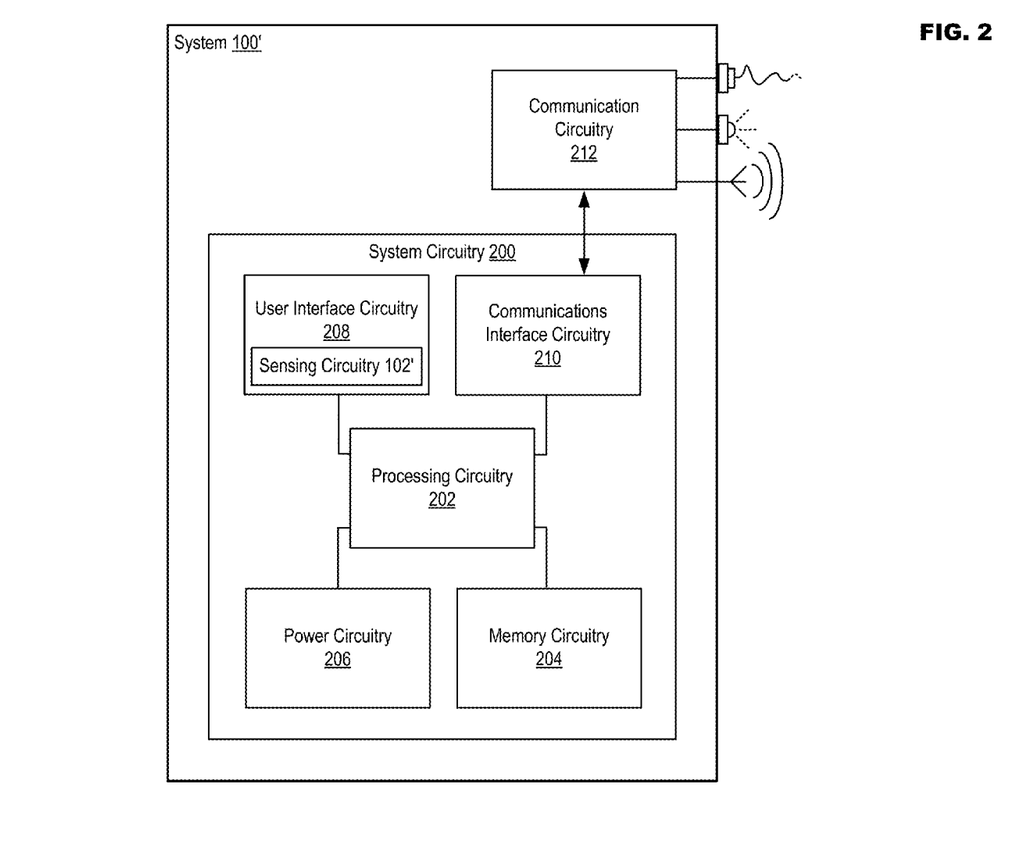
FIG. 2 illustrates an example configuration for a device usable in accordance with at least one embodiment of the present disclosure.

FIG. 2 illustrates an example configuration for a device usable in accordance with at least one embodiment of the present disclosure. System 100' may be capable of performing any or all of the activities illustrated in FIG. 1. While only one system 100' is illustrated, consistent with the present disclosure multiple devices may cooperate to perform the activities associated with system 100'. System 100' is presented only as an example of an apparatus that may be utilized in various embodiments consistent with the present disclosure, and is not intended to limit any of the various embodiments to any particular manner of configuration, implementation, etc.

System 100' may comprise at least system circuitry 200 to manage device operation. System circuitry 200 may include, for example, processing circuitry 202, memory circuitry 204, power circuitry 206, user interface circuitry 208 and communications interface circuitry 210. System 100' may further include communication circuitry 212. While communication circuitry 212 is shown as separate from system circuitry 200, the example configuration of system 100' has been provided herein merely for the sake of explanation. Some or all of the functionality associated with communication circuitry 212 may also be incorporated into system circuitry 200.

In system 100', processing circuitry 202 may comprise one or more processors situated in separate components, or alternatively one or more processing cores situated in one component (e.g., in a System-on-Chip (SoC) configuration), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors or any other evolution of computing paradigm or physical implementation of such integrated circuits (ICs), etc. Examples of support circuitry may include chipsets (e.g., Northbridge, Southbridge, etc. available from the Intel Corporation) configured to provide an interface via which processing circuitry 202 may interact with other system components that may be operating at different speeds, on different buses, etc. in system 100'. Moreover, some or all of the functionality commonly associated with the support circuitry may also be included in the same physical package as the processor (e.g., such as in the Sandy Bridge family of processors available from the Intel Corporation).

Processing circuitry 202 may be configured to execute various instructions in system 100'. Instructions may include program code configured to cause processing circuitry 202 to perform activities related to reading data, writing data, processing data, formulating data, converting data, transforming data, etc. Information (e.g., instructions, data, etc.) may be stored in memory circuitry 204. Memory circuitry 204 may comprise random access memory (RAM) and/or read-only memory (ROM) in a fixed or removable format. RAM may include volatile memory configured to hold information during the operation of system 100' such as, for example, static RAM (SRAM) or Dynamic RAM (DRAM). ROM may include non-volatile (NV) memory circuitry configured based on BIOS, UEFI, etc. to provide instructions when system 100' is activated, programmable memories such as electronic programmable ROMs (EPROMS), Flash, etc. Other examples of fixed/removable memory may include, but are not limited to, magnetic memories such as hard disk (HD) drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power circuitry 206 may include internal power sources (e.g., a battery, fuel cell, etc.) and/or external power sources (e.g., electromechanical or solar generator, power grid, external fuel cell, etc.), and related circuitry configured to supply system 100' with the power needed to operate. User interface circuitry 208 may include hardware and/or software to allow users to interact with system 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 208 may be incorporated within system 100' and/or may be coupled to system 100' via a wired or wireless communication medium. In an example implementation wherein system 100' is a multiple device system, user interface circuitry 208 may be optional in devices such as, for example, servers (e.g., rack/blade servers, etc.) that omit user interface circuitry 208 and instead rely on another device (e.g., an operator terminal) for user interface functionality.

Communications interface circuitry 210 may be configured to manage packet routing and other functionality for communication circuitry 212, which may include resources configured to support wired and/or wireless communications. In some instances, system 100' may comprise more than one set of communication circuitry 212 (e.g., including separate physical interface circuitry for wired protocols and/or wireless radios) managed by communications interface circuitry 210. Wired communications may include serial and parallel wired or optical mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, ZigBee, etc.), long range wireless mediums (e.g., cellular wide-area radio communication technology, satellite-based communications, etc.), electronic communications via sound waves, lasers, etc. In one embodiment, communications interface circuitry 210 may be configured to prevent wireless communications that are active in communication circuitry 212 from interfering with each other. In performing this function, communications interface circuitry 210 may schedule activities for communication circuitry 212 based on, for example, the relative priority of messages awaiting transmission. While the embodiment disclosed in FIG. 2 illustrates communications interface circuitry 210 being separate from communication circuitry 212, it may also be possible for the functionality of communications interface circuitry 210 and communication circuitry 212 to be incorporated into the same circuitry.

Figure 3:
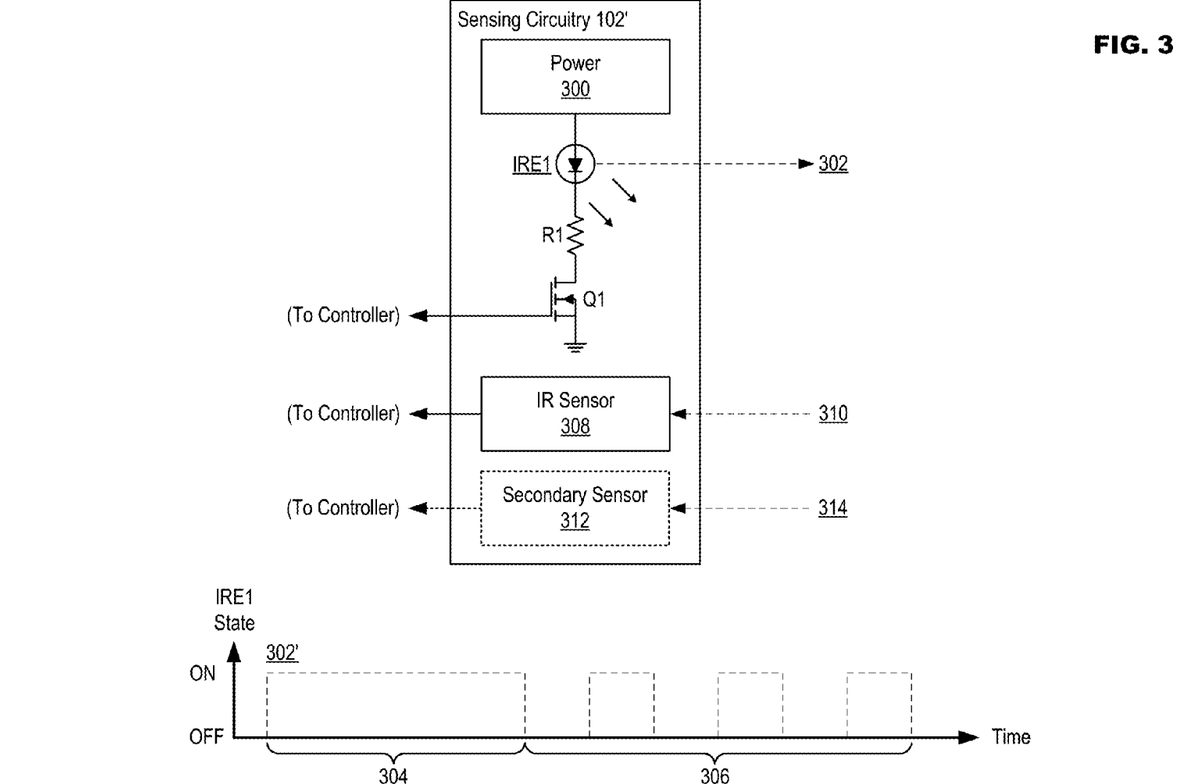
FIG. 3 illustrates example sensing circuitry in accordance with at least one embodiment of the present disclosure.

Consistent with the present disclosure, sensing circuitry 102' may be situated within user interface circuitry 208. A possible implementation of sensing circuitry 102' is illustrated in FIG. 3. Sensing circuitry 102' may interact with at least processing circuitry 202 in system 100'. In an example of operation, a user may seek access to system 100', specific hardware or software on system 100', another resource controlled by system 100 (e.g., an area, a structure, etc.) The user may interact with system 100', which may result in processing circuitry 202 causing at least sensing circuitry 102' in user interface circuitry 208 to perform iris recognition. In performing iris recognition sensing circuitry 102' may generate at least one of a uniform IR emission or a pulsed IR emission to illuminate one or both eyes of the user, and may then capture at least one image based on the illumination. The images may then be provided to processing circuitry 202, which may interact with memory circuitry 204 and possibly communication circuitry 212 (e.g., where known user pattern data is stored on another device) to determine whether the user is a known user approved for the requested access. Processing circuitry may further perform tests, such as tests 104 to 106 described in regard to FIG. 1, to authenticate that a real user is present.

FIG. 3 illustrates example sensing circuitry in accordance with at least one embodiment of the present disclosure. An example implementation of sensing circuitry 102' is shown in FIG. 3. The components described in regard to sensing circuitry 102' are merely representative of the functionality to be performed by sensing circuitry 102'. Some or all of these components may be removed, replaced, or other components may be added to achieve the same operational affect.

Sensing circuitry 102' may comprise a power source 300 (e.g., 5V±5%) to supply power to IR emitter IRE1. IRE1 may be, for example, a SFH 4780S IR light source from OSRAM Inc. IRE1 may be coupled to resistor R1 (e.g., 4.32Ω/1%/1.5 W), which may further be coupled to switch Q1. Switch Q1 may be, for example, IRLML0030 power metal oxide semiconductor field effect transistor (MOSFET) from International Rectifier Inc. In particular, switch Q1 may be coupled between resistor R1 and ground, with the gate coupled to a controller in system 100'. For example, switch Q1 may be coupled to a platform controller hub (PCH) within processing circuitry 202 via a general purpose input output (GPIO) coupling. In an example of operation, the controller may control switch Q1 to cause IRE1 to generate emission 302. Emission 302', shown at the bottom of FIG. 3, demonstrates how IRE1 may operate. Time period 304 illustrates a uniform IR emission wherein, for example, iris recognition may take place. Time period 306 demonstrates a pulsed IR emission wherein, for example, testing to authenticate that one or more real eyes are being recognized may take place. While a consistent pulse pattern is illustrated, the pulse pattern may be varied to prevent spoof data from including a response to a known pattern. IR sensor 308 in sensing circuitry 102' may then capture images of the one or more illuminated eyes as shown at 310 (e.g., the eyes being illuminated by the IR emission generated by IRE1).

Consistent with the present disclosure, sensing circuitry 102' may further comprise at least one secondary sensor 312 to sense secondary data 314. Secondary sensor 312 may include, for example, a visual image capture sensor such as a red, green, blue (RGB) sensor, microphone, proximity sensor, fingerprint scanner, etc. Secondary data 314 may, in at least one embodiment, be used to bolster or strengthen the confidence of the iris recognition. For example, performing iris recognition along with determining that a user is actually proximate to the testing equipment and/or recognizing the user's facial features, voice, fingerprint, etc. improves the confidence that the user being tested is actually present for the test and/or is actually whom he/she claims to be.

Figure 4:
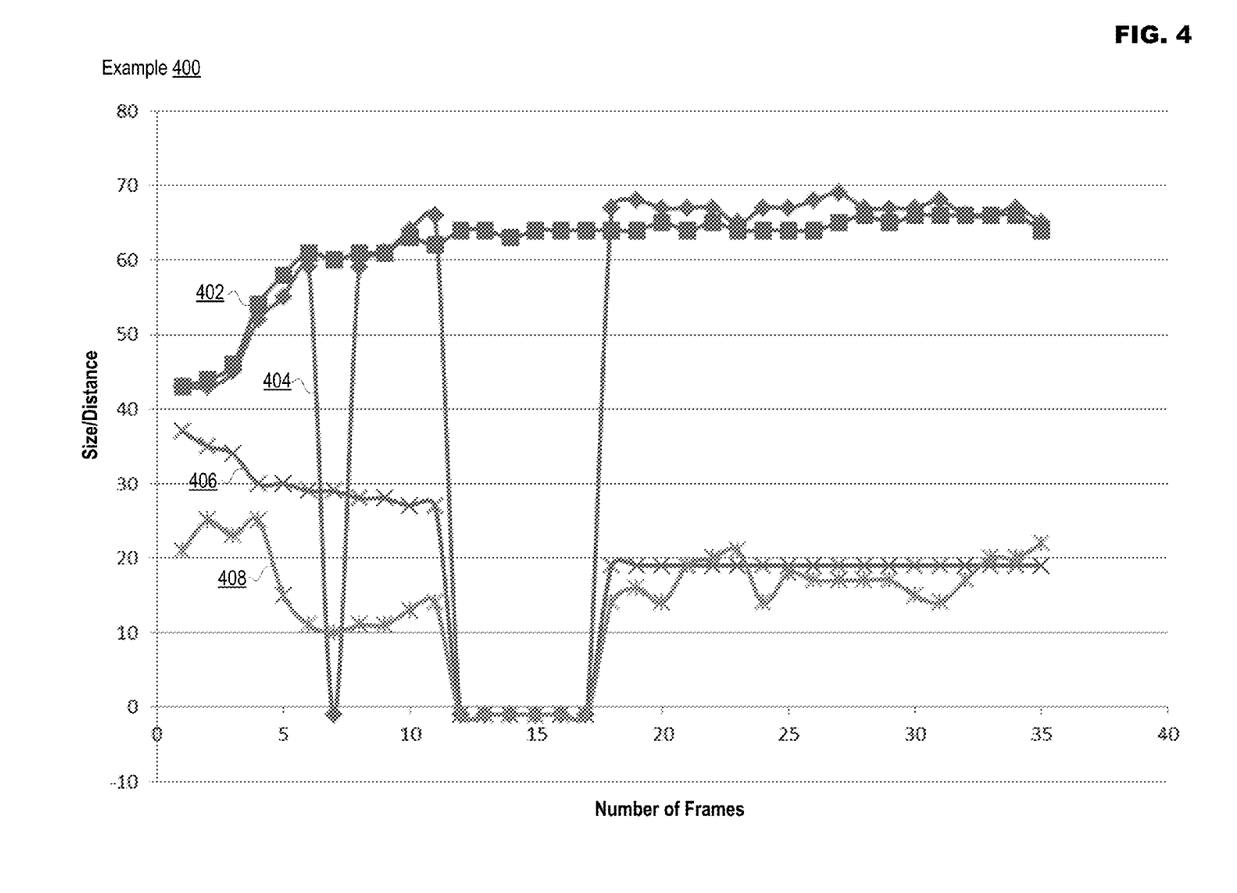
FIG. 4 illustrates an example graph of eye parameters over time without LED pulsing in accordance with at least one embodiment of the present disclosure.

FIG. 4 illustrates an example graph of eye parameters over time without LED pulsing in accordance with at least one embodiment of the present disclosure. Example graph 400 includes four plots: first eye pupil plot 402 (line with squares), second eye pupil plot 404 (line with diamonds), distance from the sensor 406 (line with X) and iris occlusion 408 (line with *). Initially, the lack of activity illustrated between the captured images or "frames" 10 and 20 for second eye pupil plot 404, distance plot 406 and iris occlusion plot 408 is due to no data being captured during the time period when these frames were captured. The different plots in FIG. 4 demonstrate that initially there is some eye activity seen in both the first and second eyes in, for example frames 0 to 10, but that the activity eventually settles down for both eyes. As a result, it may be difficult to determine based only on uniform IR emission whether one or more real eyes are being tested or spoofing is occurring (e.g., utilizing simulated or prerecorded eye activity).

Figure 5:
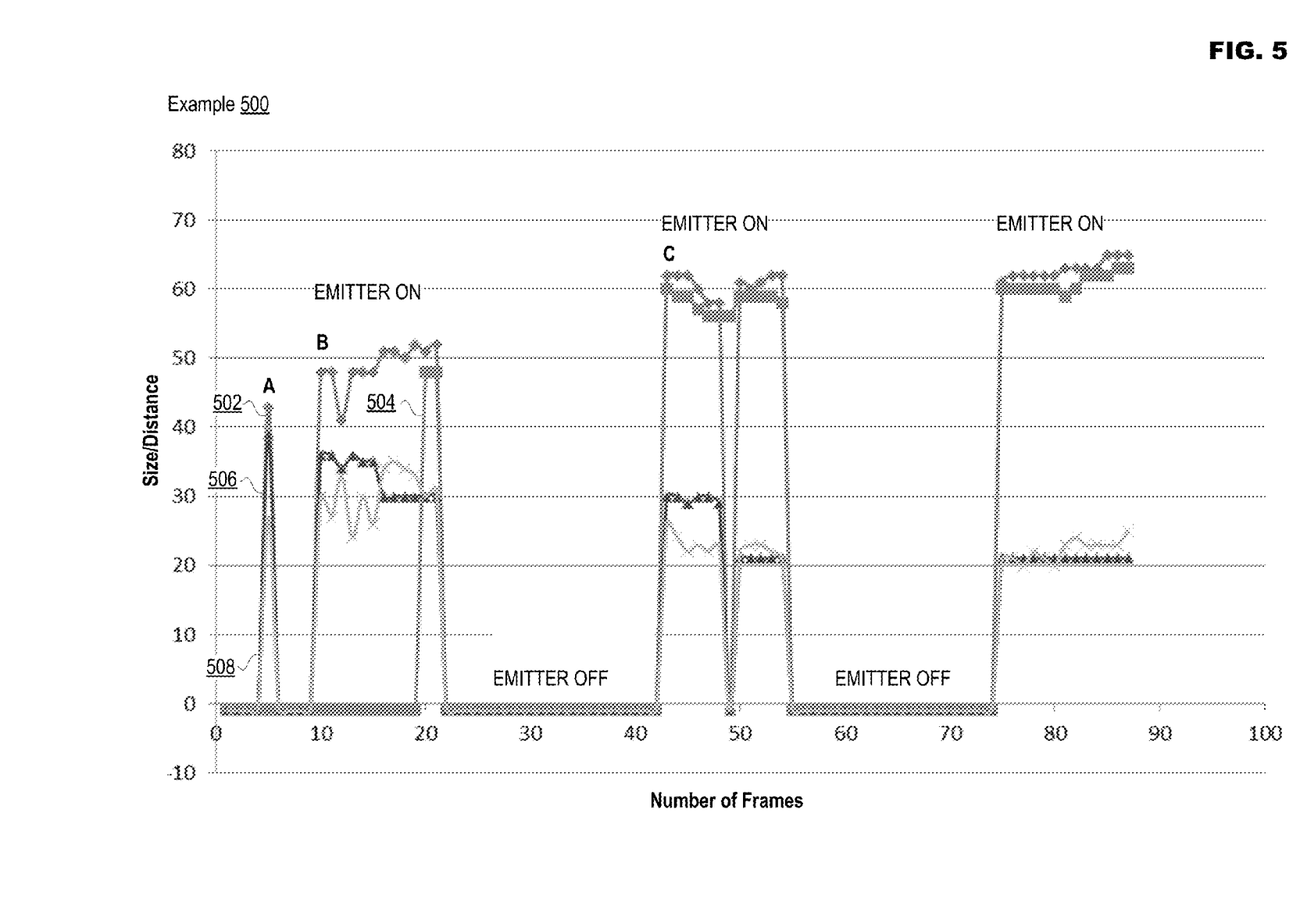
FIG. 5 illustrates an example graph of eye parameters over time including LED pulsing in accordance with at least one embodiment of the present disclosure.

FIG. 5 illustrates an example graph of eye parameters over time including LED pulsing in accordance with at least one embodiment of the present disclosure. Example graph 500 includes four plots: first eye pupil plot 502 (line with diamonds), second eye pupil plot 504 (line with squares), distance from the sensor 506 (line with triangles) and iris occlusion 508 (line with X). The plots in FIG. 5 demonstrate that, in response to the IR pulses labeled "A," "B" and "C" in graph 500, at least first eye pupil size 502 and eye iris occlusion 506 may continue to be reactive over a larger range of frames as compared to uniform IR emission (e.g., initiating at about frame 5 and continuing until about frame 43). In particular, a substantial increase in first eye pupil size 502 is seen between IR pulses A and B, with first eye pupil size 502 finally starting to stabilize during IR pulse C. As a result, it may be easier for system 100 to determine that a real eye exists based on sensing the longer duration of at least pupil and iris occlusion response corresponding to time periods when the IR emission is pulsed. Again, the pattern of IR pulse emission may be varied so that data cannot be manufactured based on an anticipated pulse pattern.

Figure 6:
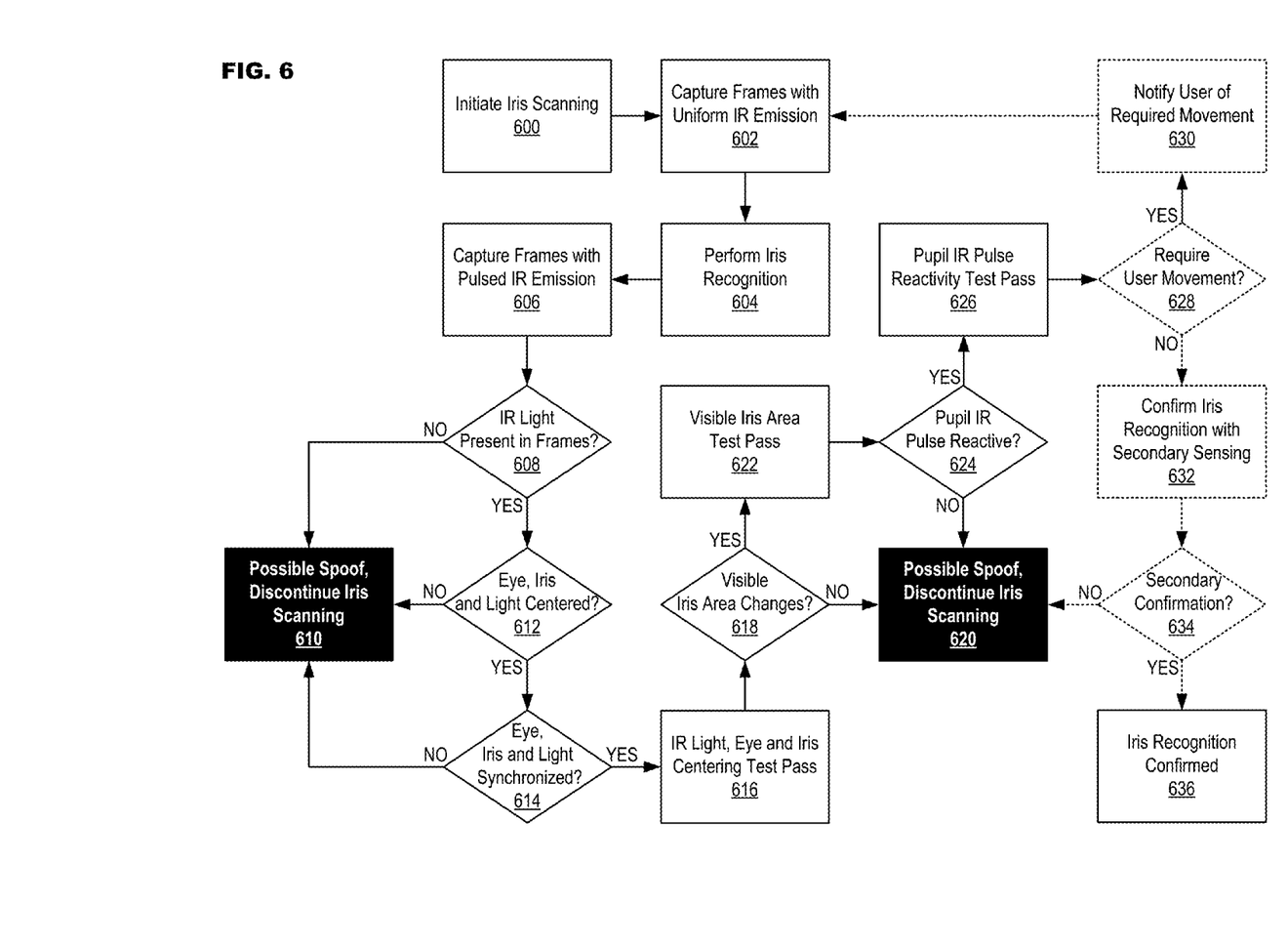
FIG. 6 illustrates example operations for iris recognition including liveness testing in accordance with at least one embodiment of the present disclosure.

FIG. 6 illustrates example operations for iris recognition including liveness testing in accordance with at least one embodiment of the present disclosure. Operations illustrated with a dotted outline may be optional in that they may be implemented based on, for example, the use for which a system is intended, the abilities of the equipment and/or software in the system, the level of access protect required, etc. In operation 600, iris scanning may be initiated. At least one frame may then be captured utilizing uniform IR mission in operation 602, followed by iris recognition being performed in operation 604. At least one frame may then be captured utilizing pulsed IR emission in operation 606. A determination may then be made in operation 608 as to whether an IR light reflection exists in the captured frames. If in operation 608 it is determined that no IR light reflection is present, then in operation 610 iris scanning may be discontinued due to possible spoofing. A determination in operation 608 that an IR light reflection is present may be followed by a further determination in operation 612 as to whether the eye center, iris center and IR light reflection are aligned. A determination in operation 612 that there is no alignment may be followed by operation 610 wherein iris scanning is discontinued. If in operation 612 it is determined that the eye center, iris center and IR light reflection are aligned, then in operation 614 a further determination may be made as to whether the eye center, iris center and IR light reflection are synchronized (e.g., whether they follow each other) in subsequent captured images. A determination in operation 614 that there is no synchronization may be followed by operation 610 wherein iris scanning is discontinued. If in operation 610 it is determined the eye center, iris center and IR light reflection are synchronized throughout a series of captured images, then the IR light, eye and iris centering test may be considered passed in operation 616.

Operation 616 may be followed by a determination made in operation 618 as to whether a visible portion of an iris in at least one eye changes through a series of images. If in operation 618 it is determined that the visible portion of the iris does not change, then in operation 620 iris scanning may discontinue due to possible spoofing. If in operation 618 it is determined that the visible portion of the iris does change, then in operation 622 the visible iris area test may be considered passed. Operation 622 may be followed by operation 624 wherein a determination may be made as to whether at least one pupil in at least one eye is reactive to IR pulsing. In at least one embodiment, pupil reactivity may include not only the pupil varying, but also varying in accordance with the pulse pattern that was emitted in operation 606. If in operation 624 it is determined that the pupil did not react as expected to the IR pulsing, then in operation 620 iris scanning may discontinue. If in operation 624 it is determined that the pupil is reactive, then in operation 626 the pupil IR pulse reactivity test may be considered passed.

Operation 626 may be followed by operation 628 wherein a determination may be made as to whether to require the user to move in a specific manner. In at least one embodiment, a user undergoing iris recognition may be instructed (e.g., may receive an audible, visible, etc. notification) to move in a particular manner during an instance where the system is capturing images. The system may then analyze the images to determine if, for example, the user's eyes moved in a manner consistent with the instructed movement. In this manner the presence of an actual user may be further confirmed. In in operation 628 it is determined that user movement is required, then in operation 630 the user may be notified of the required movement. Operation 630 may be followed by a return to operation 602 to capture additional images when the user is moving as specified. If in operation 628 it is determined that user movement is unnecessary, then in operation 632 iris recognition may be confirmed with secondary sensing. Secondary sensing may take place at any time during the operations disclosed in FIG. 6, and may include collecting secondary data that may also be used to confirm user presence and/or identity. A determination may be made in operation 634 as to whether secondary confirmation is possible based on the secondary data. A determination in operation 634 that secondary confirmation is not possible may be followed by operation 620 wherein iris sensing may discontinue. If in operation 634 it is determined that secondary confirmation is possible, then in operation 636 the iris recognition may be complete and the access requested by the user may be granted (e.g., providing that the user was recognized as a known user in operation 604).

While FIG. 6 illustrates operations according to an embodiment, it is to be understood that not all of the operations depicted in FIG. 5 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, this disclosure pertains to iris recognition including liveness testing. A device may perform iris recognition with testing to check liveness. Sensing circuitry in the device may comprise an IR sensor and IR emitter to generate a uniform IR emission and a pulsed IR emission. Sensor data based on the uniform IR emission may be used for iris recognition, which may be confirmed by at least one test confirming that real eyes are being analyzed and not spoof data. For example, a determination may be made as to whether a light reflection is visible in images captured by the IR sensor, whether the light reflection is aligned and/or synchronized with an eye center and/or iris center, whether a portion of the iris visible in the captured images changes from image to image, whether the images show that a pupil of the eye is reactive to the pulsed IR emissions, etc.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for iris recognition including liveness testing.

According to example 1 there is provided a system including iris recognition functionality. The system may comprise sensing circuitry to generate sensor data based on sensing characteristics of at least one eye when illuminated by infrared emissions and processing circuitry to cause the sensing circuitry to generate uniform infrared emissions and pulsed infrared emissions, perform iris recognition using the sensor data and perform at least one liveness test using the sensor data.

Example 2 may include the elements of example 1, wherein the sensing circuitry comprises at least an infrared emitter, an infrared receiver, a resistor and a switch.

Example 3 may include the elements of any of examples 1 to 2, wherein the processing circuitry is to perform iris recognition using the sensor data generated based on the uniform infrared emissions.

Example 4 may include the elements of any of examples 1 to 3, wherein the processing circuitry is perform the at least one liveness test using the sensor data generated based on the pulsed infrared emissions.

Example 5 may include the elements of any of examples 1 to 4, wherein the sensor data comprises at least one image of the at least one eye illuminated by the uniform or pulsed infrared emissions and in performing the at least one liveness test the processing circuitry is to determine if a light reflection generated by the uniform or pulsed infrared emissions appears in the at least one image.

Example 6 may include the elements of example 5, wherein the processing circuitry is to determine if the light reflection appearing in the at least one image is centered with at least one of an eye center or iris center appearing in the at least one image.

Example 7 may include the elements of any of examples 5 to 6, wherein the processing circuitry is to determine if the light reflection appearing in the at least one image is synchronized with at least one of an eye center or iris center appearing in the at least one image.

Example 8 may include the elements of any of examples 5 to 7, wherein the processing circuitry is to determine if the light reflection appearing in the at least one image is at least one of centered or synchronized with at least one of an eye center or iris center appearing in the at least one image.

Example 9 may include the elements of any of examples 1 to 8, wherein the sensor data comprises images including an iris of the at least one eye illuminated by the uniform or pulsed infrared emissions and in performing the at least one liveness test the processing circuitry is to determine if a size of a visible area of the iris varies in the images.

Example 10 may include the elements of any of examples 1 to 9, wherein the sensor data comprises images including a pupil of the at least one eye illuminated by the pulsed infrared emissions and in performing the at least one liveness test the processing circuitry is to determine if a size of the pupil varies in the images corresponding to the pulsed infrared emissions.

Example 11 may include the elements of any of examples 1 to 10, wherein the system further comprises user interface circuitry and the processing circuitry is further to cause user interface circuitry to generate notifications.

Example 12 may include the elements of example 11, wherein the notifications instruct a user how to move with respect to at least the sensing circuitry.

Example 13 may include the elements of any of examples 1 to 12, wherein the sensing circuitry further comprises at least one secondary sensor to generate secondary data for confirming the iris recognition.

Example 14 may include the elements of example 13, wherein the secondary sensor is to sense at least one of visible data, audible data or user proximity.

Example 15 may include the elements of any of examples 1 to 14, wherein the processing circuitry is to perform iris recognition using the sensor data generated based on the uniform infrared emissions and perform the at least one liveness test using the sensor data generated based on the pulsed infrared emissions.

Example 16 may include the elements of any of examples 1 to 15, wherein the system is a mobile device, a computing device, a security system for a vehicle or a security system for a structure.

According to example 17 there is provided a method for iris recognition with liveness testing. The method may comprise causing sensing circuitry in a system to generate uniform infrared emissions and pulsed infrared emissions, generating sensor data in the sensing circuitry based on at least one eye being illuminated by at least one of the uniform or pulsed infrared emissions, performing iris recognition in the system using the sensor data and performing at least one liveness test in the system using the sensor data.

Example 18 may include the elements of example 17, wherein the iris recognition is performed using the sensor data generated based on the uniform infrared emissions.

Example 19 may include the elements of any of examples 17 to 18, wherein the at least one liveness test is performed using the sensor data generated based on the pulsed infrared emissions.

Example 20 may include the elements of any of examples 17 to 19, wherein the sensor data comprises at least one image of the at least one eye illuminated by the uniform or pulsed infrared emissions and performing the at least one liveness test includes determining if a light reflection generated by the uniform or pulsed infrared emissions appears in the at least one image.

Example 21 may include the elements of example 20, and may further comprise at least one of determining if the light reflection appearing in the at least one image is centered with at least one of an eye center or iris center appearing in the at least one image, or determining if the light reflection appearing in the at least one image is synchronized with at least one of an eye center or iris center appearing in the at least one image.

Example 22 may include the elements of any of examples 17 to 21, wherein the sensor data comprises images including an iris of the at least one eye illuminated by the uniform or pulsed infrared emissions and performing the at least one liveness test includes determining if a size of a visible area of the iris varies in the images.

Example 23 may include the elements of any of examples 17 to 22, wherein the sensor data comprises images including a pupil of the at least one eye illuminated by the pulsed infrared emissions and performing the at least one liveness test includes determining if a size of the pupil varies in the images corresponding to the pulsed infrared emissions.

Example 24 may include the elements of any of examples 17 to 23, wherein the iris recognition is performed using the sensor data generated based on the uniform infrared emissions and the at least one liveness test is performed using the sensor data generated based on the pulsed infrared emissions.

Example 25 may include the elements of any of examples 17 to 24, and may further comprise generating at least one notification using user interface circuitry in the system to instruct a user how to move with respect to at least the sensing circuitry.

Example 26 may include the elements of any of examples 17 to 25, and may further comprise sensing secondary data using at least one secondary sensor in the sensing circuitry and confirming the iris recognition based on the secondary data.

According to example 27 there is provided a system including at least one device, the system being arranged to perform the method of any of the above examples 17 to 26.

According to example 28 there is provided a chipset arranged to perform the method of any of the above examples 17 to 26.

According to example 29 there is provided at least one machine readable medium comprising a plurality of instructions that, in response to be being executed on a computing device, cause the computing device to carry out the method according to any of the above examples 17 to 26.

According to example 30 there is provided at least one device to perform iris recognition with liveness testing, the at least one device being arranged to perform the method of any of the above examples 17 to 26.

According to example 31 there is provided a system for iris recognition with liveness testing. The system may comprise means for causing sensing circuitry in a system to generate uniform infrared emissions and pulsed infrared emissions, means for generating sensor data in the sensing circuitry based on at least one eye being illuminated by at least one of the uniform or pulsed infrared emissions, means for performing iris recognition in the system using the sensor data and means for performing at least one liveness test in the system using the sensor data.

Example 32 may include the elements of example 31, wherein the iris recognition is performed using the sensor data generated based on the uniform infrared emissions.

Example 33 may include the elements of any of examples 31 to 32, wherein the at least one liveness test is performed using the sensor data generated based on the pulsed infrared emissions.

Example 34 may include the elements of any of examples 31 to 33, wherein the sensor data comprises at least one image of the at least one eye illuminated by the uniform or pulsed infrared emissions and the means for performing the at least one liveness test include means for determining if a light reflection generated by the uniform or pulsed infrared emissions appears in the at least one image.

Example 35 may include the elements of example 34, and may further comprise at least one of means for determining if the light reflection appearing in the at least one image is centered with at least one of an eye center or iris center appearing in the at least one image, or means for determining if the light reflection appearing in the at least one image is synchronized with at least one of an eye center or iris center appearing in the at least one image.

Example 36 may include the elements of any of examples 31 to 35, wherein the sensor data comprises images including an iris of the at least one eye illuminated by the uniform or pulsed infrared emissions and the means for performing the at least one liveness test include means for determining if a size of a visible area of the iris varies in the images.

Example 37 may include the elements of any of examples 31 to 36, wherein the sensor data comprises images including a pupil of the at least one eye illuminated by the pulsed infrared emissions and the means for performing the at least one liveness test include means for determining if a size of the pupil varies in the images corresponding to the pulsed infrared emissions.

Example 38 may include the elements of any of examples 31 to 37, wherein the iris recognition is performed using the sensor data generated based on the uniform infrared emissions and the at least one liveness test is performed using the sensor data generated based on the pulsed infrared emissions.

Example 39 may include the elements of any of examples 31 to 38, and may further comprise means for generating at least one notification using user interface circuitry in the system to instruct a user how to move with respect to at least the sensing circuitry.

Example 40 may include the elements of any of examples 31 to 39, and may further comprise means for sensing secondary data using at least one secondary sensor in the sensing circuitry and means for confirming the iris recognition based on the secondary data.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system including iris recognition functionality, comprising:
   sensing circuitry to generate sensor data based on sensing characteristics of at least one eye when illuminated by infrared emissions; and
   processing circuitry to:
      cause the sensing circuitry to generate uniform infrared emissions and pulsed infrared emissions;
      perform iris recognition using the sensor data; and
      perform at least one liveness test using the sensor data;
   wherein:
   the sensor data comprises at least one image of the at least one eye illuminated by the uniform or pulsed infrared emissions;
   in performing the at least one liveness test the processing circuitry is to determine if a light reflection generated by the uniform or pulsed infrared emissions appears in the at least one image, and is to determine if:
   the light reflection appearing in the at least one image is centered with at least one of an eye center or iris center appearing in the at least one image; or
   the light reflection appearing in the at least one image synchronized with at least one of an eye center or iris center appearing in the at least one image.

2. The system of claim 1, wherein the sensing circuitry comprises at least an infrared emitter, an infrared receiver, a resistor and a switch.

3. The system of claim 1, wherein the processing circuitry is to perform iris recognition using the sensor data generated based on the uniform infrared emissions.

4. The system of claim 1, wherein the processing circuitry is perform the at least one liveness test using the sensor data generated based on the pulsed infrared emissions.

5. The system of claim 1, wherein the processing circuitry is to determine if the light reflection appearing in the at least one image is centered with at least one of an eye center or iris center appearing in the at least one image.

6. The system of claim 1, wherein the processing circuitry is to determine if the light reflection appearing in the at least one image is synchronized with at least one of an eye center or iris center appearing in the at least one image.

7. The system of claim 1, wherein the sensor data comprises images including an iris of the at least one eye illuminated by the uniform or pulsed infrared emissions and in performing the at least one liveness test the processing circuitry is to determine if a size of a visible area of the iris varies in the images.

8. The system of claim 1, wherein the sensor data comprises images including a pupil of the at least one eye illuminated by the pulsed infrared emissions and in performing the at least one liveness test the processing circuitry is to determine if a size of the pupil varies in the images corresponding to the pulsed infrared emissions.

9. The system of claim 1, wherein the system further comprises user interface circuitry and the processing circuitry is further to cause user interface circuitry to generate notifications.

10. The system of claim 1, wherein the sensing circuitry further comprises at least one secondary sensor to generate secondary data for confirming the iris recognition.

11. A method for iris recognition with liveness testing, comprising:
   causing sensing circuitry in a system to generate uniform infrared emissions and pulsed infrared emissions;
   generating sensor data in the sensing circuitry based on at least one eye being illuminated by at least one of the uniform or pulsed infrared emissions;
   performing iris recognition in the system using the sensor data; and
   performing at least one liveness test in the system using the sensor data;
   wherein:
   the sensor data comprises at least one image of the at least one eye illuminated by the uniform or pulsed infrared emissions;
   performing the at least one liveness test includes determining if a light reflection generated by the uniform or pulsed infrared emissions appears in the at least one image; and
   the method further comprises:
      determining if the light reflection appearing in the at least one image is centered with at least one of an eye center or iris center appearing in the at least one image; or
      determining if the light reflection appearing in the at least one image is synchronized with at least one of an eye center or iris center appearing in the at least one image.

12. The method of claim 11, wherein the iris recognition is performed using the sensor data generated based on the uniform infrared emissions.

13. The method of claim 11, wherein the at least one liveness test is performed using the sensor data generated based on the pulsed infrared emissions.

14. The method of claim 11, wherein the method comprises determining if the light reflection appearing in the at least one image is centered with at least one of an eye center or iris center appearing in the at least one image.

15. The method of claim 11, wherein the method comprises
determining if the light reflection appearing in the at least one image is synchronized with at least one of an eye center or iris center appearing in the at least one image.

16. The method of claim 11, wherein the sensor data comprises images including an iris of the at least one eye illuminated by the uniform or pulsed infrared emissions and performing the at least one liveness test includes determining if a size of a visible area of the iris varies in the images.

17. The method of claim 11, wherein the sensor data comprises images including a pupil of the at least one eye illuminated by the pulsed infrared emissions and performing the at least one liveness test includes determining if a size of the pupil varies in the images corresponding to the pulsed infrared emissions.

18. At least one non-transitory machine-readable storage medium having stored thereon, individually or in combination, instructions for iris recognition with liveness testing that, when executed by one or more processors, cause the one or more processors to:
cause sensing circuitry in a system to generate uniform infrared emissions and pulsed infrared emissions;
generate sensor data in the sensing circuitry based on at least one eye being illuminated by at least one of the uniform or pulsed infrared emissions;
perform iris recognition in the system using the sensor data; and
perform at least one liveness test in the system using the sensor data;
wherein:
the sensor data comprises at least one image of the at least one eye illuminated by the uniform or pulsed infrared emissions;
performing the at least one liveness test includes determining if a light reflection generated by the uniform or pulsed infrared emissions appears in the at least one image; and
the instructions when executed further cause the one or more processors to:
determine if the light reflection appearing in the at least one image is centered with at least one of an eye center or iris center appearing in the at least one image; or
determine if the light reflection appearing in the at least one image is synchronized with at least one of an eye center or iris center appearing in the at least one image.

19. The non-transitory storage medium of claim 18, wherein the iris recognition is performed using the sensor data generated based on the uniform infrared emissions.

20. The non-transitory storage medium of claim 18, wherein the at least one liveness test is performed using the sensor data generated based on the pulsed infrared emissions.

21. The non-transitory storage medium of claim 18, wherein the instructions when executed cause the one or more processors to determine if the light reflection appearing in the at least one image is centered with at least one of an eye center or iris center appearing in the at least one image.

22. The non-transitory storage medium of claim 18, wherein the instructions when executed cause the one or more processors to:
determine if the light reflection appearing in the at least one image is synchronized with at least one of an eye center or iris center appearing in the at least one image.

23. The non-transitory storage medium of claim 18, wherein the sensor data comprises images including an iris of the at least one eye illuminated by the uniform or pulsed infrared emissions and the instructions to perform the at least one liveness test include instructions to determine if a size of a visible area of the iris varies in the images.

24. The non-transitory storage medium of claim 18, wherein the sensor data comprises images including a pupil of the at least one eye illuminated by the pulsed infrared emissions and the instructions to perform the at least one liveness test include instructions to determine if a size of the pupil varies in the images corresponding to the pulsed infrared emissions.

* * * * *